(No Model.)

F. D. HAYWARD.
PROCESS OF MANUFACTURING RUBBER HEELS.

No. 371,316. Patented Oct. 11, 1887.

WITNESSES
Fred W. Hersey
John F. Nelson

INVENTOR
Francis D. Hayward,
By Wm. Robinson,
Attorney.

UNITED STATES PATENT OFFICE.

FRANCIS D. HAYWARD, OF MALDEN, MASSACHUSETTS.

PROCESS OF MANUFACTURING RUBBER HEELS.

SPECIFICATION forming part of Letters Patent No. 371,316, dated October 11, 1887.

Application filed April 7, 1886. Serial No. 198,048. (No model.)

*To all whom it may concern:*

Be it known that I, FRANCIS D. HAYWARD, a citizen of the United States, residing at Malden, in the county of Middlesex and State of Massachusetts, have invented a new and useful Process of Manufacturing Metal-Plated Rubber Heels for Boots or Shoes, (for which I have not obtained a patent in any country,) of which the following is a specification.

The object of my invention is to produce a partially-vulcanized rubber heel for boots or shoes, having a portion of its wearing-surface provided with a metal plate secured to said heel by upwardly-projecting studs embedded therein, said heel being adapted for application to a green-rubber boot or shoe, which is afterward vulcanized with said heel attached thereto.

My invention consists in the process of manufacturing such partially-vulcanized metal-plated rubber heel, as hereinafter described.

Figure 1:
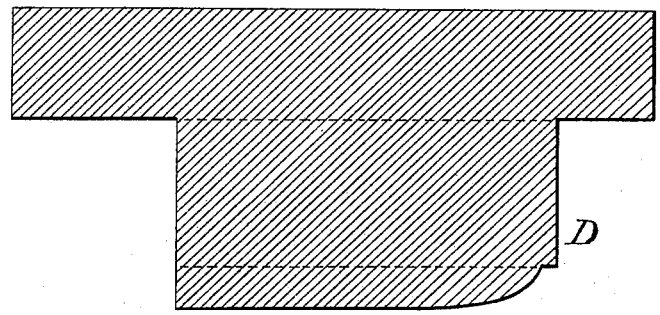
Figure 1:
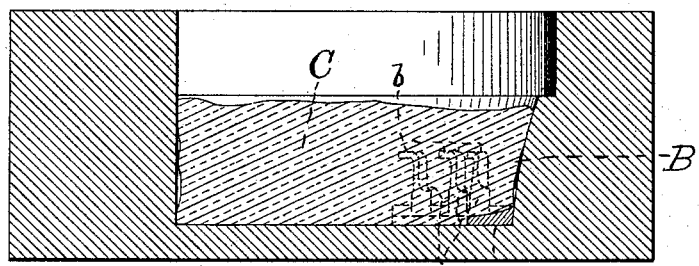
Figure 2:
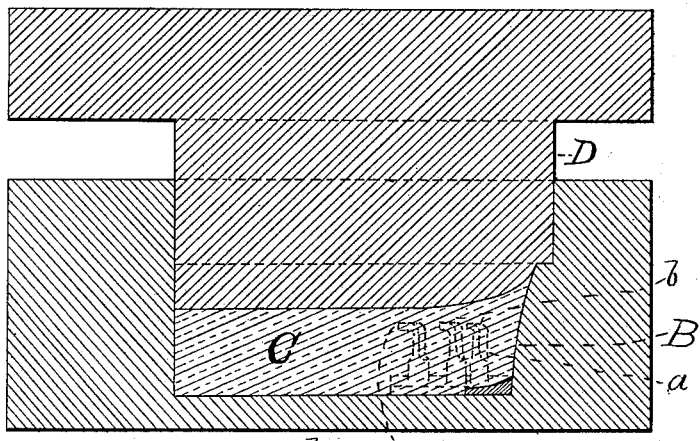
Figure 3:
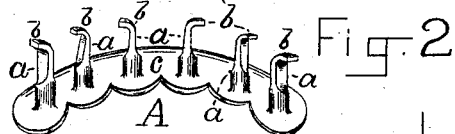

In the accompanying drawings, which form a part of this specification, Figure 1 is a vertical longitudinal section of the open heel-mold, showing the heel-plate and the rubber composition as just inserted in the mold. Fig. 2 is a similar view of the closed mold, showing the metal-plated heel as fully formed under pressure, and Fig. 3 is a perspective view of the heel-plate.

Similar letters of reference indicate corresponding parts in all the figures.

A is a curving heel-plate, consisting of the base-plate $c$, provided with upwardly-projecting studs $a$, which latter are provided at their upper ends with hooks $b$, or other suitable devices adapted to securely anchor the same in the substance of the rubber composition of the heel.

In forming my metal-plated heel the heel-plate A, constructed substantially as described, is placed in proper position in the matrix B of the mold, the base-plate $c$ of the heel-plate resting on the bottom of the mold, as shown. The plastic rubber composition C, of which the heel is formed, is then placed in the mold, as shown in Fig. 1. The upper pressure-block, D, is then brought down on said plastic rubber composition C, which by pressure is forced between and around said studs and projections $a$ and $b$, as shown in Fig. 2, and fills every portion of the mold not occupied by said metal plate with its projections. The heel is then subjected while still in the mold to the vulcanizing process, and is taken out of the mold a finished, metal-plated, partially-vulcanized rubber heel, the plate flush with the surface of the heel and occupying the rear wearing-surface thereof, as shown in Figs. 1 and 2.

The partially-vulcanized metal-plated rubber heel, manufactured as described, is thus adapted for application to the green-rubber boot or shoe, which is afterward vulcanized with said partially-vulcanized heel attached thereto.

The upright studs $a$, with their horizontal projections $b$, serve to securely anchor the base-plate $c$ in its position on the rear wearing-surface of the heel and flush with the general surface thereof, and prevent the possibility of said plate being torn away from the rubber heel without tearing the latter to pieces. At the same time a metal-plated heel formed in the manner described presents a neater and more finished appearance and is also cheaper and much more substantial than is possible in the case of heel to which a plate has been attached, by riveting or otherwise, after the heel or the boot has been finished.

A further advantage of a heel constructed in accordance with my invention is that there can be no leakage of water into the interior of the boot around the anchoring-studs. This is an important desideratum, since when heel-plates are riveted or nailed on the heels of completed rubber boots or shoes water finds entrance into the interior of the same around the nails.

In carrying out my invention the exact form of the studs and projections $a$ and $b$ is immaterial, provided only that they shall be of suitable relative form to afford a reliable anchorage in the plastic and vulcanized substance of the rubber heel.

I do not herein claim the metal heel-plate A by itself, as I claim that in my pending application filed April 7, 1886, Serial No. 198,049.

What I claim as my invention, and desire to secure by Letters Patent, is—

The process herein described of manufacturing heels for rubber boots or shoes provided with a metal studded plate embedded therein, which consists in placing the metal plate in a mold with the studs projecting upwardly, pressing the plastic or green rubber around said plate and studs, and then partially vulcanizing said heel under pressure, thus adapting it for application to a green-rubber boot or shoe, which is afterward vulcanized thereto, substantially as set forth.

FRANCIS D. HAYWARD.

Witnesses:
WILLIAM ROBINSON,
DAVID C. HENNESSY.